Dec. 4, 1923.

C. G. LUNDSTROM 1,476,528

DEMOUNTABLE RIM

Filed July 1, 1922

2 Sheets-Sheet 1

Inventor
Carl G. Lundstrom
By John A. Bommhardt
Atty.

Dec. 4, 1923.
C. G. LUNDSTROM
DEMOUNTABLE RIM
Filed July 1, 1922
1,476,528
2 Sheets-Sheet 2

Inventor
Carl G. Lundstrom.
By John A. Bommhardt
Atty.

Patented Dec. 4, 1923.

1,476,528

UNITED STATES PATENT OFFICE.

CARL G. LUNDSTROM, OF CLEVELAND, OHIO.

DEMOUNTABLE RIM.

Application filed July 1, 1922. Serial No. 572,351.

*To all whom it may concern:*

Be it known that I, CARL G. LUNDSTROM, a citizen of the United States, residing at Cleveland, in the county of Cuyahoga and State of Ohio, have invented certain new and useful Improvements in Demountable Rims, of which the following is a specification.

This invention relates to demountable rims, and has for its principal object to provide a rim made in sections, which can readily be assembled for the purpose of holding a tire. Although capable of use with various kinds of pneumatic and cushion tires, it is particularly suited for the latter, and was especially designed for use with a tire such as that disclosed in my pending application for resilient tire, Serial No. 500,422 filed September 13, 1921. Said pending application discloses a cushion tire having an outer tread section and an inner cushion section, and for the purpose of the present application, and merely as an example, a somewhat similar tire is illustrated in the present case, certain modifications however being made as will more fully appear from the following description.

The rim is of the sectional channel type and embodies three main members consisting of a cross split band or base ring, and a pair of symmetrical ring flanges which are, assembled and interlocked with the band when in use. The rim may be mounted on any suitable felly or felly band, one of the standard kinds being illustrated.

Figure 1:
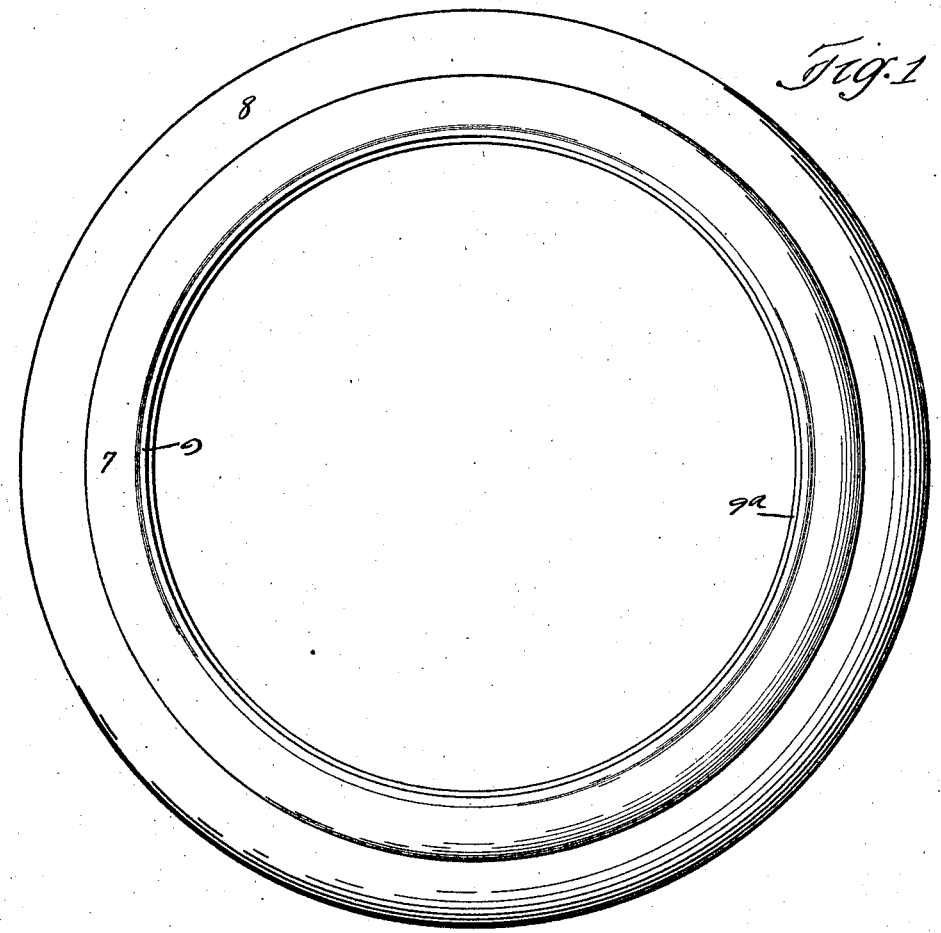
Figure 2:
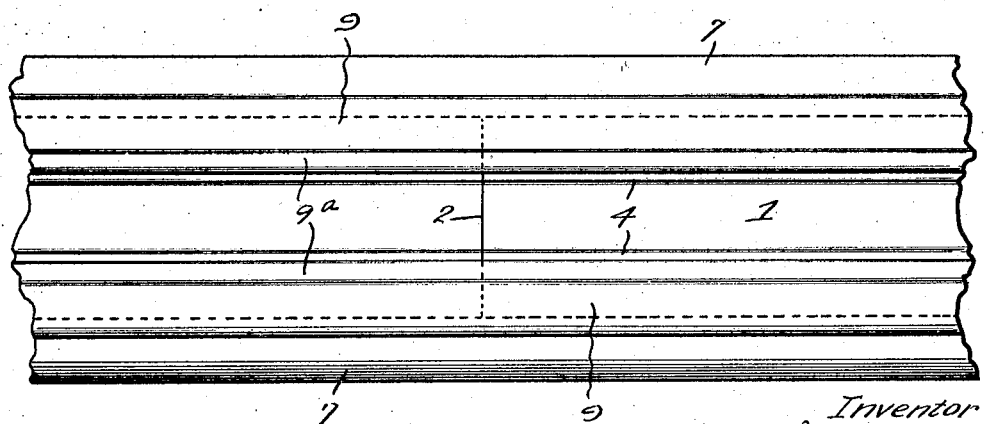
Figure 3:
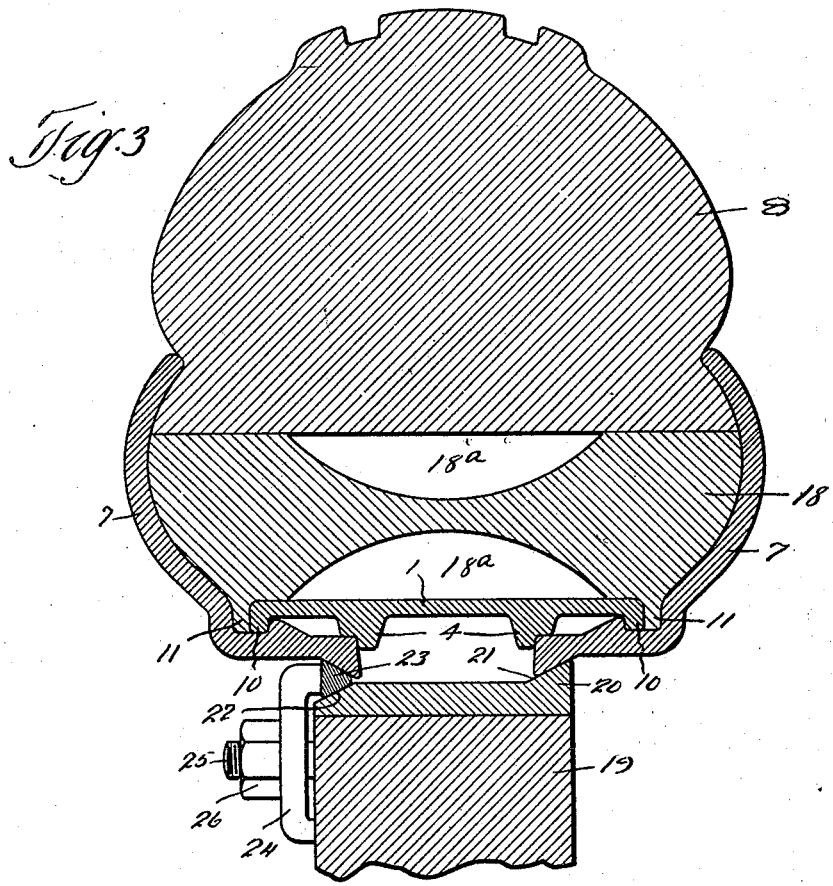
Figure 4:
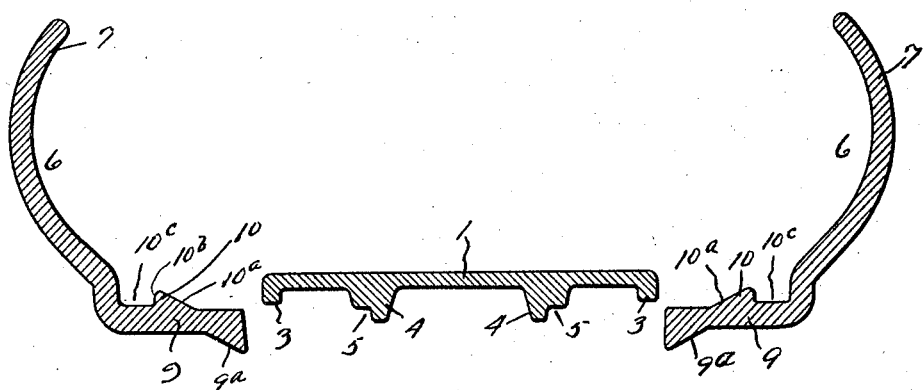

The invention is illustrated in the accompanying drawings in which Fig. 1 is a side view of the rim with a tire thereon. Fig. 2 is a fragmental enlarged inside plan view of the rim. Fig. 3 is a cross section of the rim with the tire thereon, and mounted upon a felly. Fig. 4 is a section of the rim with the parts separated.

Referring specifically to the drawings, 1 indicates an inner circular band or base member which is split as indicated at 2, crosswise, so that it may be expanded and contracted for the purposes to be described hereinafter. The outer surface of this band is flat as shown. The inner or under surface is provided with a flange 3 at each edge of the band, and also with a pair of parallel ribs 4 which are spaced apart and each of which is provided on its outer lateral face with a step 5. These flanges and ribs extend completely around the inner face of the band.

Associated with this band is a pair of continuous flange members 6 which are adapted to grip the sides of the tire, and when assembled with the band produce a separable channel. Each member 6 has an outer side portion 7 curved or shaped to hook over the base of the tire, and an inner portion 9 which forms part of the base of the rim when the members are assembled. On the outer face of the base portion 9 is a continuous circular rib 10, extending around the same, the side of this rib toward the center line of the wheel being beveled as indicated at 10a and the opposite side being square or straight as indicated at 10b, thereby defining one wall of a groove 10c which extends around each member. The inner edge of the base portion 9 is enlarged or thickened and beveled as indicated at 9a, said bevel being presented outwardly or away from the center line of the wall.

The tire, shown merely for purposes of illustration, comprises an outer tread member 8 and an inner cushion member 18 which has recesses or pockets 18a to form air cushions. These tire members are gripped at the sides by the flanges 7 as shown.

The rim when assembled is mounted upon a felly band 20 extending around the felly 19, and this felly band has at one edge a beveled surface 21 and at the opposite edge a beveled surface 22, and against the latter fits a clamping ring 23, wedge-shaped in cross section, which is pressed home by clips 24 and nuts 26 on bolts 25 projecting from the felly.

The inner side of the cushion member 18 has at each edge a projecting rib 11 which is adapted to fit within the groove 10c above described.

To assemble the parts, the tire members 18 and 8 are placed on the band 1 and the side rings 6 are then pressed into place, the portions 9 of the side rings being forced inwardly under the edges of the band 1, and in this action the flanges 3 of the band ride up the inclines 10a and finally snap over the ribs 10, the split in the band 1 permitting the band to expand for this purpose. When fully forced together the flanges 3 engage and interlock over the ribs 10, and at the same time the inner edges of the portions 9 enter and rest in the seats 5 in the ribs 4. The rim and tire are then mounted on the felly, the incline 9a fitting against the bevel 21 on the felly band. The wedge ring 23 is then set in place between the bevel 9ª on the other side ring and the bevel 22 on the felly band, the clips are tightened to hold the rim on the felly. To separate the parts the rim is slipped off the felly by removing the clips, and then the band 1 is expanded from the inside until the flanges 3 are disengaged from the ribs 10, permitting the side flanges to drop off and releasing the tire. The rim may thus be readily assembled or disassembled. The tongues or ribs 11 are compressed when the side flanges 6 are forced into place, thereby forming a tight joint which seals the air pockets or cushions of the cushion member. The pressure or tension of the tire members tends to contract the band 1 to hold it engaged with the side rings, and if a pneumatic tire is used the air pressure in the tire assists this operation, but when deflated the band may be expanded by appropriate pressure on the inside, to disengage the parts. Similar pressure will have the same result when the cushion tire is used, the cushion member 18 being made of comparatively soft rubber which will compress to permit such disengagement. It may be noted that since the side rings 6 are continuous, the clamping pressure of the ring 23 is sustained by said rings 6 and consequently does not tend to expand the base band 1.

The invention is not limited to the particular form shown, but various changes may be made within the scope of the following claims.

I claim:

1. A rim comprising an inner split band, and a pair of side rings having inner portions which fit within and interlock the said band.

2. A rim comprising an inner expansible band having flanges projecting inwardly at its edges, and a pair of side rings having base portions which fit within the band and provided with circular ribs interlocking the said flanges.

3. A rim comprising a split band having inwardly projecting flanges at its side edges, and a pair of side rings adapted to engage a tire, and having base portions which fit within the band and are provided with circular ribs which snap under and interlock with said flanges when said base portions are forced within the band.

4. A rim having a split band provided with a flange projecting inwardly at one edge thereof and a removable side ring adapted to engage a tire and having a base portion adapted to fit within the band and provided with a rib which snaps under and interlocks with the flange when the parts are assembled.

5. A rim comprising a split base band having a pair of ribs extending around its inner surface, and a pair of side rings having base members fitting within the band and seated against said ribs, said band and base members having interlocking means engageable when said base members are forced within the band.

6. A rim comprising an inner split band having flanges projecting inwardly at its edges, and a pair of side rings adapted to engage a tire, each of said side rings having a base portion which fits within one edge of the band, said base portion having on its outer side a rib which interlocks with a flange on the band and having on its inner side an inclined surface adapted to fit against a clamping member mounted on a felly.

In testimony whereof, I affix my signature in presence of two witnesses.

CARL G. LUNDSTROM.

Witnesses:
B. C. LUNDSTROM,
JOHN A. BOMMHARDT.